(12) United States Patent
Fan

(10) Patent No.: US 9,033,371 B2
(45) Date of Patent: May 19, 2015

(54) COUNTERFEIT PREVENTION USING MINIATURE SECURITY MARKS

(75) Inventor: Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2070 days.

(21) Appl. No.: 11/317,768

(22) Filed: Dec. 23, 2005

(65) Prior Publication Data

US 2007/0158434 A1    Jul. 12, 2007

(51) Int. Cl.
*B42D 15/00* (2006.01)
*H04N 1/32* (2006.01)
*B41M 3/14* (2006.01)

(52) U.S. Cl.
CPC *B42D 15/00* (2013.01); *B41M 3/14* (2013.01); *H04N 1/32144* (2013.01); *H04N 2201/3271* (2013.01)

(58) Field of Classification Search
USPC ........... 235/487–489, 494, 900; 283/105, 901
See application file for complete search history.

(56) References Cited

U.S. PATENT DOCUMENTS

| | | | |
|---|---|---|---|
| 6,516,305 B1 * | 2/2003 | Fraser | 706/8 |
| 6,820,807 B1 * | 11/2004 | Antognini et al. | 235/454 |
| 6,992,793 B2 | 1/2006 | Takebayashi | |
| 2004/0145674 A1 * | 7/2004 | Hoppe et al. | 348/371 |

FOREIGN PATENT DOCUMENTS

| | | |
|---|---|---|
| EP | 1 059 800 A2 | 12/2000 |
| JP | 2002-19221 A | 1/2002 |

OTHER PUBLICATIONS

Machine Learning http://replay.waybackmachine.org/20051205171934/http://en.wikipedia.org/wiki/Machine_learning Dec. 5, 2005.*
Pattern Recognition http://replay.waybackmachine.org/20051211041238/http://en.wikipedia.org/wiki/Pattern_recognition Dec. 11, 2005.*
Theodoridis S. et al., "Pattern Recognition Passage", Pattern Recognition, San Diego, CA., Academic Press, US, 1999, pp. 238-241, XP002405837; ISBN: 0-12-686140-4.
European Search Report for Application No. EP 06 12 6491 mailed by European Patent Office on Jan. 25, 2008.

* cited by examiner

*Primary Examiner* — Kyle Grabowski
(74) *Attorney, Agent, or Firm* — Fay Sharpe LLP

(57) ABSTRACT

A system applies a security mark to a recipient. A data reception component receives information from one or more sources. A security mark generation component generates at least one miniature security mark (MSM) configuration based at least in part upon the information from the data reception component. An application component applies the at least one MSM configuration to one or more recipients.

11 Claims, 6 Drawing Sheets

COUNTERFEIT PREVENTION USING MINIATURE SECURITY MARKS

BACKGROUND

The following relates to counterfeit prevention. It finds particular application in utilizing miniature security marks to distinguish authentic documents and/or images from counterfeit documents and/or images.

Current counterfeit prevention systems are mainly based on the use of digital watermarks. Digital watermarking is a technique which allows a user to add information (e.g., copyright notices, security codes, identification data, etc.) to digital image signals and documents. Such data can be in a group of bits describing information pertaining to the signal or to the author of the signal (e.g., name, place, etc.).

Most common watermarking methods for images work in spatial or frequency domains. There are various spatial and frequency domain techniques used for adding watermarks to and removing them from signals.

For spatial digital watermarking the simplest method involves flipping the lowest-order bit of chosen pixels in a gray scale or color image. This will work well only if the image will not be subject to any human or noisy modification. A more robust watermark can be embedded in an image in the same way that a watermark is added to paper. Such techniques may superimpose a watermark symbol over an area of the picture and then add some fixed intensity value for the watermark to the varied pixel values of the image. The resulting watermark may be visible or invisible depending upon the value (large or small, respectively) of the watermark intensity.

Spatial watermarking can also be applied using color separation. In this way, the watermark appears in only one of the color bands. This renders the watermark visibly subtle such that it is difficult to detect under regular viewing. However, the watermark appears immediately when the colors are separated for printing or xerography. This renders the document useless to the printer unless the watermark can be removed from the color band. This approach is used commercially for journalists to inspect digital pictures from a photo-stockhouse before buying un-watermarked versions.

There are several drawbacks to utilizing digital watermarking technology. To retrieve a watermark, extraction hardware and/or software need to be employed As the digital watermark usually have fairly large footprints, detectors employed to read the digital watermarks often require significant buffering storage. Consequently, this increases the detection costs, particularly if the watermark extraction is implemented in hardware.

In order to remedy this problem as well as other problems, alternative systems and methods need to be developed and employed to provide identification of images and/or documents to prevent counterfeiting.

BRIEF DESCRIPTION

In one aspect, a system applies a security mark to a recipient. A data reception component receives information from one or more sources. A security mark generation component generates at least one miniature security mark (MSM) configuration based at least in part upon the information from the data reception component. An application component applies the at least one MSM configuration to one or more recipients.

In another aspect, a system interprets data extracted from a security mark. A detection component detects one or more security marks applied to at least one recipient, wherein the security mark is a MSM configuration that includes at least one data mark and at least two anchor marks. An extraction component extracts information from the one or more MSM configurations detected by the detection component. An interpretation component determines the meaning of the information extracted from the one or more MSM configurations by the extraction component.

In yet another aspect, a method is employed to interpret information represented by a security mark. A MSM security mark is generated that includes at least one data mark and at least two anchor marks that are from about 1 micron to 100 microns in diameter, the at least one data mark is different from the at least two anchor marks. The MSM security mark is applied to at least one recipient and the at least one recipient that contains the MSM security mark is analyzed. The location of the MSM security mark applied to the at least one recipient is detected. Information from the detected MSM security mark is extracted and the information extracted from the MSM security mark is interpreted.

DETAILED DESCRIPTION

Figure 1:
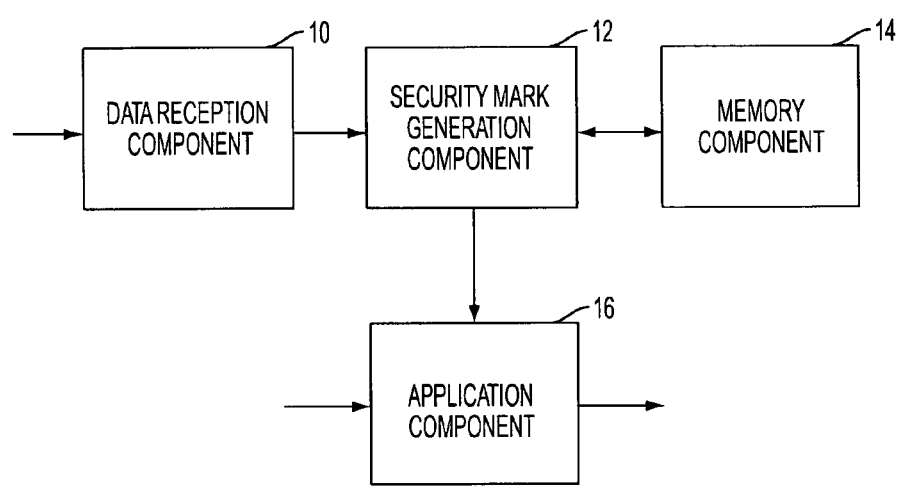
FIG. 1 illustrates a system that applies a security mark that is based at least in part on information received from one or more sources.

With reference to FIG. 1, a system that generates and applies security marks to one or more recipients is illustrated. A security mark as used herein can be any mark (e.g., depression, impression, raised, overlay, etc.) that is applied to a recipient such as an image, a graphic, a picture, a document, a body of text, etc. The security mark can contain information that can be detected, extracted and/or interpreted. Such information can be employed to prevent counterfeiting by verifying that the information contained within the security mark is accurate thereby verifying the authenticity of the recipient upon which the security mark is applied.

This system includes a data reception component 10, a security mark generation component 12, a memory component 14, and an application component 16. The data reception component 10 receives information from one or more sources (not shown). Such sources can be one or more databases, processing components, etc. that contain information related to one or more products (e.g., currency, passports, visas, banking documents, identification documents, etc.). In some cases, verification of authenticity of the one or more products is of interest to a user. In order to provide a means to verify authenticity, one or more security marks can be placed on the product. Such security marks can be detected and extracted at a later time for verification purposes.

Data can be representative of substantially any desired quantity such as origin of manufacture, date, time, serial number or simply an arbitrary alphanumeric string. In one approach, the data is proprietary such that only a limited number of users can interpret the data. For example, the data can contain an alphanumeric string of characters that represent particular data. For instance, a letter "D" can be representative of the location of manufacture for a particular currency. In another approach, a four digit numeric code can represent a sequence number (e.g., year of issuance, location of issuance, etc.) for a passport. Such information can be utilized to verify the authenticity of the recipient upon which the security mark is applied.

The security mark generation component 12 can convert received data into at least one miniature security mark (MSM) which is placed in a particular configuration. MSMs are small in size (e.g., a size between about 1 micrometer and several hundred micrometers) such that they are virtually invisible to the naked eye. Information from the data reception component 10 can be employed to generate one or more security marks. The marks that comprise a MSM configuration can be composed via one or more algorithms that convert the received data to a configuration of marks that are representative of the received data. The algorithm can utilize one or more equations, methodologies, work flows, etc. to determine the locations, sizes and/or shapes of the one or more marks. Such a determination can be made based at least in part upon one or more aspects of one or more disparate marks.

In one example, a security mark has a MSM configuration that includes at least one data mark and at least two anchor marks. The MSMs may have different colors and shapes. In particular, the anchor marks within a MSM configuration have at least one attribute (e.g., size, shape, color, etc.) that is different than the at least one data marks. In this manner, no anchor mark can have all the same attributes of any data mark.

The location, size and/or shape of the one or more data marks can determine the information contained therein. For example, a MSM configuration can contain nineteen data marks and two anchor marks. The size, shape and color of both the anchor marks and data marks can be known such that the anchor marks can be distinguished from each other. In addition, the location of the anchor marks in each MSM configuration can be known to each other and known relative to the one or more data marks. In this manner, information can be stored and extracted from a MSM configuration utilizing one or more algorithms associated therewith. The one or more algorithms can utilize at least one of mark location, size, shape and color to store and/or extract data from a MSM configuration.

Anchor marks can be employed to limit the amount of computational overhead employed in the detection and extraction of a MSM configuration. For example, greater detection requirements can be necessary since the rotation, shift and/or scaling of an image (and MSM configuration applied therein) is unknown. As a result, the computational complexity may grow exponentially as the number of marks increases. Generally, anchor marks can allow rapid determination of the location of a MSM configuration. In particular, the location of the at least one data mark relative to the anchor marks within the MSM configuration can be quickly determined. In this manner, excessive computation overhead can be mitigated. Moreover, MSM configurations can create smaller footprints than the digital watermarks, which can lower buffering storage requirements This is particularly beneficial when a greater number of data and/or anchor marks are employed. In one aspect, a detector can first identify the anchor marks, and then use them to determine location, orientation and scaling parameters. These parameters can be applied to locate the data marks at a linear computational complexity.

Algorithms can employ substantially any method to determine the location, size, shape, etc. of the data marks and/or anchor marks within a MSM configuration. For example, key dependency, mathematical morphology, etc. can be employed. Algorithms utilizing mathematical morphology can process an image utilizing a structuring element, erosion and/or dilation, for example. Informed embedding can be employed utilizing blind extraction. In one example, various techniques are employed to create compact non-authentic regions and to remove noise due to high quality compression from a false detection map. Utilizing mathematical morphology, the tampered regions can be located and noise (e.g., from lossy compression, etc.) is reduced. In another example, an algorithm that creates a geometrically invariant feature based security mark is created. Such a mark remains constant under rotation, scale, translation, etc.

The memory component 14 can contain one or more algorithms, look up tables, etc. in order to provide a method of generating a particular MSM configuration. New algorithms employed by the security mark generation component 12 can be transmitted to the memory component 14. In this manner, algorithms can be stored, viewed, edited, organized and retrieved for subsequent use. Selection of an algorithm can be based on a plurality of factors such as data source, user preference, time constraints, footprint constraints, data constraints, surface type, etc.

In order to determine an appropriate security mark generation algorithm, an artificial intelligence (AI) component (not shown) can be employed. In one aspect, the AI component can employ information received from one or more sources (e.g., databases, processors, machine control systems, etc.) to determine an appropriate algorithm. In another aspect, one or more parameters can be detected and employed to determine an appropriate algorithm. In one exemplary embodiment, the appropriate algorithm can be determined by machine learning wherein one or more training sets of data with examples of desired results and/or undesired results for data format and/or processing techniques can be utilized to train the system. In another aspect, initial conditions, based on one or more features that indicate desired results, can be utilized. Such initial conditions can be adjusted overtime and associated with returned results in order to improve discrimination.

The application component 16 can apply one or more security marks received from the security mark generation component 12 to one or more recipients. In one example, the application component 16 is a printing platform that can place a MSM configuration on a recipient (e.g., paper, velum, acetate, etc.) based at least in part upon commands received from the security mark generation component 12. In this manner, a print head, an applicator or the like can move to one or more locations relative to the recipient and distribute ink in specified locations to create a particular MSM configuration. In another example, the application component is a laser marking system that removes and/or discolors a surface of the recipient in order to create a particular MSM configuration. It is to be appreciated that the application component 16 can be substantially any device that can create one or more marks on a recipient.

Figure 2:
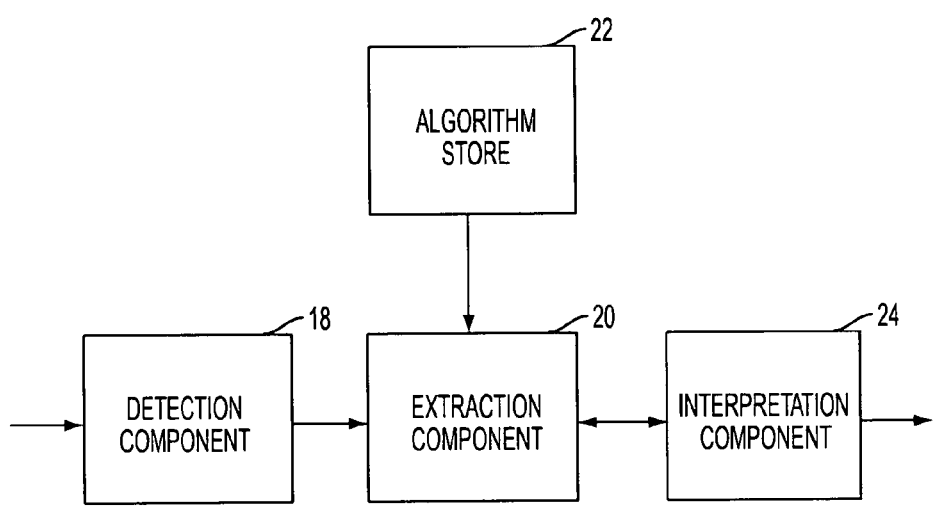
FIG. 2 illustrates a system that detects, extracts and interprets data contained within a security mark.

FIG. 2 illustrates a system that interprets a security mark (e.g., a MSM configuration) that includes a detection component 18, an extraction component 20, an algorithm store 22, and an interpretation component 24. This system can detect one or more security marks that are applied to a recipient, extract the one or more security marks and interpret the data contained within the one or more security marks. The algorithm store 22 can provide one or more algorithms utilized to extract the one or more security marks applied to the recipient.

The detection component 18 can be employed to detect one or more security marks located on a recipient. The detection component 18 can be preprogrammed such that it searches for particular configurations, specific locations, after a predetermined condition is met, etc. In this manner, the detection component 18 can be customized based on one or more user requirements. The detection component 18 can be substantially any device that can scan a recipient surface and locate one or more MSM configurations.

In one approach, the detection component 18 is a vision system that can scan a particular field utilizing a charge coupled device (CCD) array. One or more predetermined thresholds can be established related to one or more pixels within an array. Such array can be scrutinized such that pixels which meet the one or more predetermined thresholds (e.g., particular gray level, brightness, size, etc.) can be identified. The detection component 18 can process the identified pixels and determine if a MSM configuration is present. For instance, the vision system can zoom in on the surface of a bill of currency and detect the location of one or more security marks and the data contained therein.

The extraction component 20 can employ one or more algorithms to extract information contained within one or more security marks. Algorithms can contain one or more formulae, equations, methods, etc. to interpret data represented by a particular security mark. In one example, the security mark is a MSM configuration wherein data is represented by two or more anchor marks and one or more data marks. The extraction component 20 can analyze the location of the data marks relative to each other and relative to the two or more anchor marks. In addition, the extraction component can analyze the location of the anchor marks relative to each other to insure that a MSM configuration exists in a particular location. The size, shape, color, orientation, etc. of the marks can also be analyzed to extract information contained within the one or more MSM configurations.

The algorithm store 22 can be employed to store, organize, edit, view, and retrieve one or more algorithms for subsequent use. In one aspect, the extraction component 20 can retrieve one or more algorithms from the algorithm store 22 to determine the information contained within a MSM configuration. In another aspect, the extraction component 20 can determine the appropriate algorithm, methodology, etc. to extract information from one or more security marks and transmit such information to the algorithm store 22 for subsequent use.

The interpretation component 24 can determine the meaning related to data extracted from one or more security marks by the extraction component 20. Such a determination can be made based on one or more conditions such as the location of the security mark, the recipient upon which the security mark is applied, the location of the system, one or more predetermined conditions, etc. In addition, a look up table, a database, etc. can be employed by the interpretation component 24 to determine the meaning of data extracted from a security mark. In one example, the security mark is related to the recipient upon which the security mark is applied. For instance, a data string "5jrwm38f6ho" may have a different meaning when applied to a one hundred dollar bill versus a one hundred euro bill.

Figure 3:
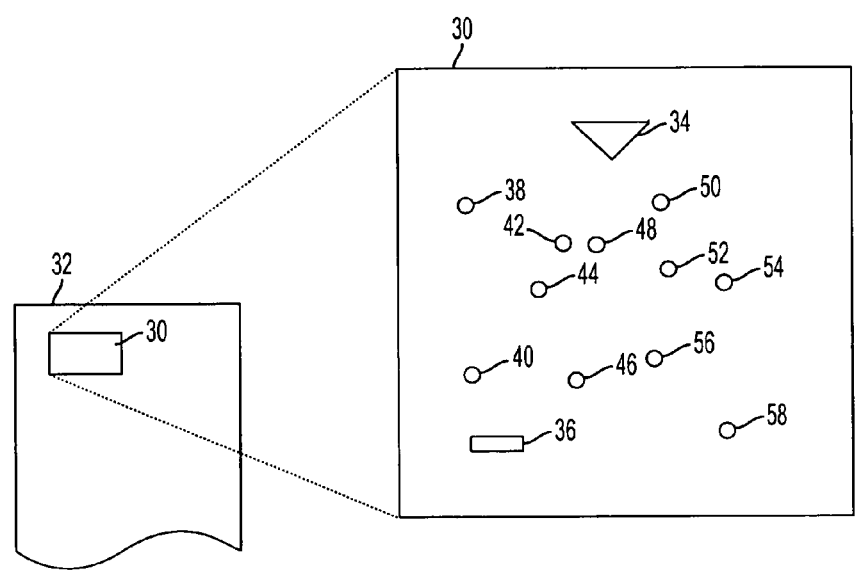
FIG. 3 illustrates an exemplary embodiment of a security mark that is a MSM configuration on a recipient.

FIG. 3 illustrates a security mark 30 applied to a recipient 32. The recipient 32 can be substantially any media or surface to which a security mark can be applied. For example, the recipient 32 can be paper, velum, acetate, etc. In addition, the recipient 32 can be employed within a particular product such as a document, a title, a license, a visa, a passport, a bill of currency, a check, etc. In addition, although a single security mark is illustrated, a plurality of security marks can be applied in substantially any location on the recipient 32.

In this embodiment, the security mark 30 is a MSM configuration that includes anchor marks 34 and 36 and data marks 38, 40, 42, 44, 46, 48, 50, 52, 54, 56, and 58. The anchor marks 36 and 38 are employed to provide two reference points for the MSM configuration. Such reference points allow data to be extracted regardless of the scale, orientation, truncation, image degradation, etc. of the security mark 30. Thus, systems employed to extract data from the security mark 30 are not dependent on a perfect, properly oriented security mark 30 in order to extract data contained therein. As a result, recipient handling does not have to be constrained.

In this embodiment, the anchor mark 34 is a triangle, the anchor mark 36 is a rectangle, and the data marks 38-58 are miniature circles. It is to be appreciated that the anchor marks 34 and 36 and/or the data marks 38-58 can be substantially any shape, size, orientation, color, etc. However, the anchor marks 34 and 36 cannot be identical to any of the data marks 38-58. The anchor marks 34 and 36 can be located in substantially any location relative to each other and/or the data marks 38-58. In addition, the data marks 38-58 can be located in substantially any location relative to each other.

Figure 4:
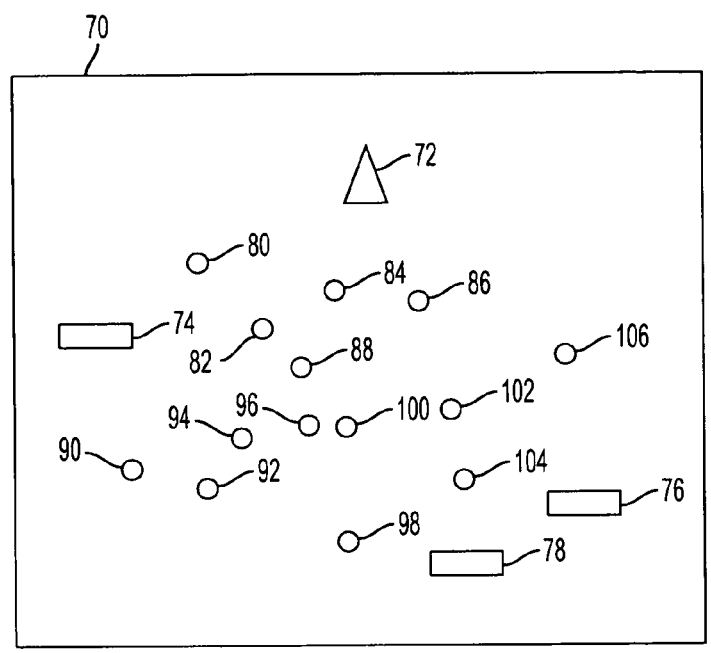
FIG. 4 illustrates an exemplary MSM configuration.

FIG. 4 illustrates a security mark 70 that has a MSM configuration. The security mark 70 includes anchor marks 72, 74, 76, and 78 and data marks 80, 82, 84, 86, 88, 90, 92, 94, 96, 98, 100, 102, 104, and 106. The anchor mark 72 is a triangle and the anchor marks 74, 76, and 78 are rectangles. The data marks 80-104 are miniature circles. The data marks 80-104 and/or anchor marks 72-78 can be comprised of substantially any color outline and/or fill. In one example, the data marks 80-104 are comprised of a white outline with no fill. In another example, the anchor marks 72-78 are comprised of a black outline with a red fill.

Figure 5:
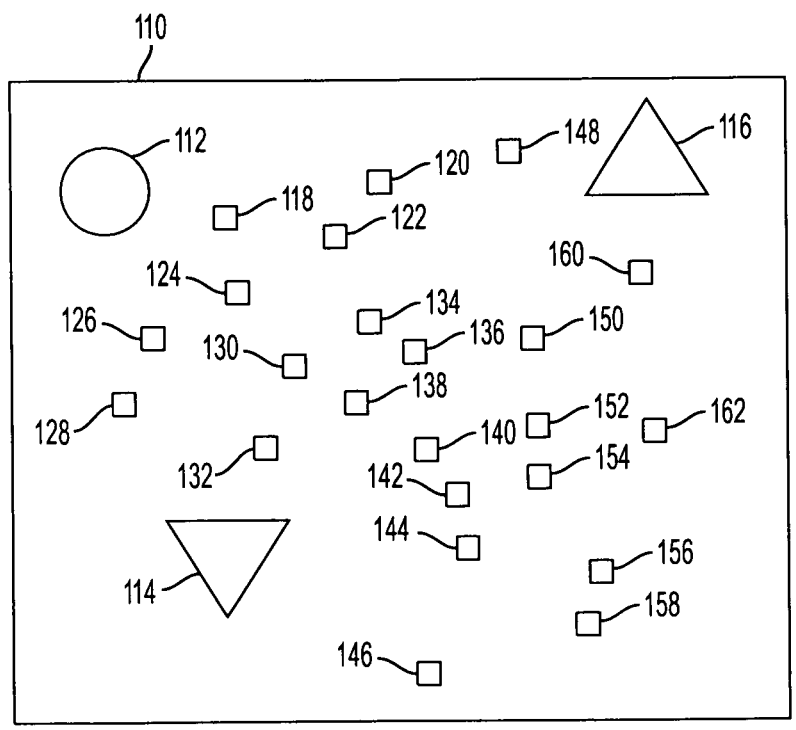
FIG. 5 illustrates another exemplary MSM configuration.

FIG. 5 illustrates a security mark 110 that has a MSM configuration. The security mark 110 includes anchor marks 112, 114, and 116 and data marks 118, 120, 122, 124, 126, 128, 130, 132, 134, 136, 138, 140, 142, 144, 146, 148, 150, 152, 154, 156, 158, 160, and 162. The anchor mark 112 is a circle and the anchor marks 114 and 116 are triangles. The data marks 118-162 are miniature squares.

Figure 6:
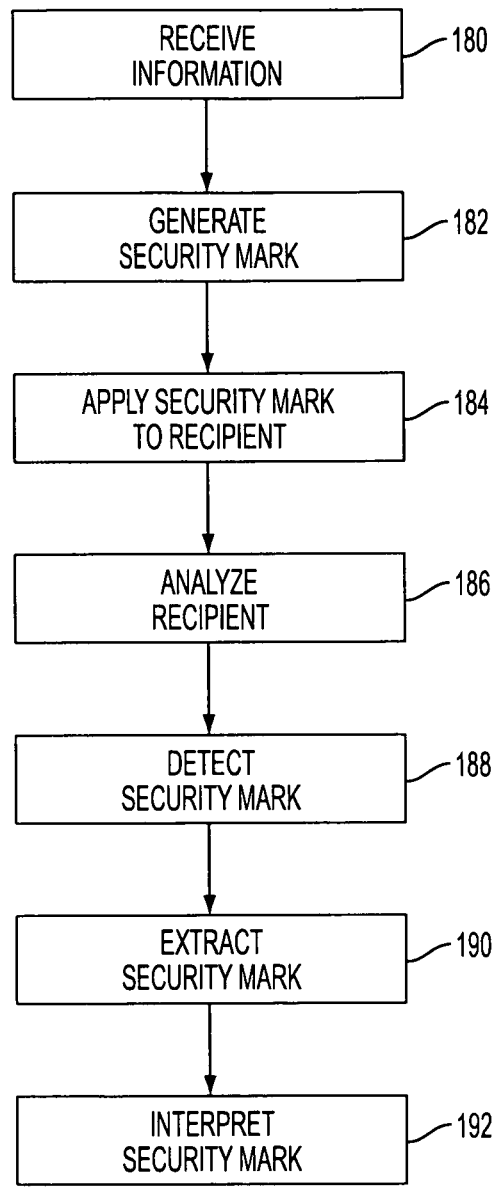
FIG. 6 illustrates a methodology to interpret data generated via a security mark.

While, for purposes of simplicity of explanation, the methodologies of FIG. 6 is shown and described as executing serially, it is to be understood and appreciated that the exemplary embodiment is not limited by the illustrated order, as some aspects could, in accordance with the exemplary embodiment, occur in different orders and/or concurrently with other aspects from that shown and described herein. Moreover, not all illustrated features may be required to implement a methodology in accordance with an aspect of the exemplary embodiment.

At reference numeral 180, information is received from one or more sources. Such information can contain data pertaining to source, date, time, serial number, sequential code, etc. In one example, the information is a proprietary alphanumeric sequence that is known only to a limited number of parties. At 182, a security mark is generated based at least in part upon the information received at 180. The security mark can be a MSM configuration that utilizes at least two anchor points and at least one data point. In one example, thesecurity mark can be generated utilizing one or more algorithms that can determine the size, shape, color, orientation and location of the two or more anchor points and the one or more data points.

At 184, the security mark is applied to a recipient. Application of the security mark can be accomplished utilizing substantially any device such as a printing platform, a laser marker, a pin stamp marker, etc. In addition, substantially any methodology such as xerography, printing, image transfer, etc. can be employed to apply the security mark to a recipient. The recipient can be any material such as paper, velum, acetate, glass, etc. upon which a security mark can be placed and subsequently detected and extracted.

At 186, the recipient is analyzed. This analysis can determine the context wherein a security mark may be employed. For example, the type of recipient, the location of the analysis, the material that comprises the recipient, text and/or images placed on the recipient, etc. can be determined. In one example, the same security mark may have different meanings related to the recipient upon which it is placed. At 188, the security mark is detected. Detection can be performed by a number of means such as video, vision systems, human, etc. In this manner, the location, size, orientation, etc. of the security mark can be determined.

At 190, the security mark is extracted to determine the data contained therein. Extraction of the security mark can be accomplished by one or more algorithms, formulae, equations, methods, etc. to interpret data represented by a particular security mark. In one example, the security mark is a MSM configuration wherein data is represented by two or more anchor marks and one or more data marks. Analysis can be performed to determine the location of the data marks relative to each other and relative to the two or more anchor marks. The size, shape, color, orientation, etc. of the marks can also be analyzed to extract information contained within the one or more MSM configurations.

At 192, the security mark is interpreted. Once data has been extracted from the security mark, it is interpreted to determine its meaning. Such interpretation can be contextual, as the same data extracted from various disparate contexts can have different meanings. In one example, the same alphanumeric string extracted from a security mark on a passport can have a different meaning than on a bill of currency. Once data is interpreted, it can be output for further processing.

It will be appreciated that variations of the above-disclosed and other features and functions, or alternatives thereof, may be desirably combined into many other different systems or applications. Various and variant embodiments presently unforeseen or unanticipated alternatives, modifications, variations or improvements therein may be subsequently made by those skilled in the art which are also intended to be encompassed by the following claims. In addition, the claims can encompass embodiments in hardware, software, or a combination thereof.

The invention claimed is:

1. A system that applies a security mark to a recipient, comprising:
    a data reception component that receives information from one or more sources;
    a memory component which stores at least one of:
        an algorithm, a formula, a method, a look up table, a database, and a process that is at least one of:
            stored, viewed, edited, organized, and retrieved for use in generating a particular security mark configuration;
    a security mark generation component that generates at least one security mark configuration comprising:
        at least two anchor marks which provide reference points that allow detection and extraction of the security mark configuration regardless of the size, shift and/or rotation of the security mark configuration;
        wherein at least one of the anchor marks includes a shape which is non-rectangular; and
        at least one data mark which is different from the anchor marks in at least one of: size, shape, and color; and
    an application component that applies the at least one security mark configuration to one or more recipients, wherein the security mark configuration includes:
        at least three data marks located within a proximity of the at least two anchor marks that is representative of the information received by the data reception component and placed in any location relative to each other.

2. The system according to claim 1, wherein at least one of the anchor marks includes a color outline and/or fill.

3. The system according to claim 1, wherein the security mark configuration applied utilizes at least one of printing, engraving, embossing, discoloration and material removal of the recipient.

4. The system according to claim 1, wherein security mark generation is based on at least one of a data source, a user preference, a time constraint, a footprint constraint, a data constraint, and a surface type.

5. The system according to claim 1, wherein the information received is representative of at least one of an origin of manufacture, a date, a time, a serial number, and an alphanumeric string.

6. The system according to claim 1, wherein the recipient is one of paper, velum, acetate, and glass.

7. The system according to claim 1, wherein the recipient is one of a document, a title, a license, a deed, a visa, a passport, a bill of currency, and a check.

8. The system according to claim 1, further comprising:
    an artificial intelligence component which employs information received from said one or more sources to determine at least one appropriate security mark generation algorithm by machine learning, wherein said machine learning is achieved by employing at least one training set of data having examples of at least one of desired and undesired results for at least one of data format and processing techniques that can be utilized to train the system;
    and wherein the security mark generation components generates at least one security mark based upon an algorithm determined from the artificial component.

9. A method for applying a security mark to a recipient, said method comprising:
    receiving information from at least one source into a data reception component;
    employing said information to develop at least one security mark generation algorithm using machine learning by an artificial intelligence component, wherein said machine learning is achieved by employing at least one training set of data having examples of at least one of desired and undesired results for at least one of data format and processing techniques that can be utilized to train the system;
    generating at least one security mark configuration using said at least one security mark generation algorithm from said artificial intelligence component, wherein said at least one mark is based at least in part upon the association between the information received from the data component and the information received from the memory component, the security mark configuration includes:
        at least two anchor marks which provide reference points that allow detection and extraction of the security mark configuration regardless of the size, shift and/or rotation of the security mark configuration;
        wherein at least one anchor mark includes a shape which is non-rectangular; and
        at least three data marks located within a proximity of the at least two anchor marks that is representative of the information received by the data reception component and placed in any location relative to each other; and applying the at least one security mark configuration to one or more recipients.

10. The method according to claim 9, wherein the the anchor marks and/or data marks include a color outline and/or fill.

11. A system that applies a security mark to a recipient, comprising:

a data reception component that receives information from one or more sources;

a memory component, separate from said data reception component that stores at least one of an algorithm, a formula, a method, a look up table, a database, and a process that is at least one of stored, viewed, edited, organized, and retrieved for use in generating a particular security mark configuration;

an artificial intelligence component that determines an appropriate security mark generation algorithm for generating a particular security mark configuration, said at least one security mark generation algorithm determined by machine learning, wherein said machine learning is achieved by employing at least one training set of data having examples of at least one of desired and undesired results for at least one of data format and processing techniques that can be utilized to train the system;

a security mark generation component that generates at least one security mark configuration that includes:

at least three data marks; and at least two anchor marks which provide reference points that allow detection and extraction of the security mark configuration regardless of the size, shift and/or rotation of the security mark configuration, wherein said security mark is based upon the association between the information from the data reception component and the information received from the artificial intelligence component;

wherein at least one of the anchor marks includes a shape which is non-rectangular;

wherein the at least three data marks are located within a proximity of the at least two anchor marks that is representative of the information received by the data reception component and are placed in any location relative to each other; and an application component that applies the at least one security mark configuration to one or more recipients.

* * * * *